J. F. CROCKETT.
Car-Coupling.

No. 218,358. Patented Aug. 5, 1879.

WITNESSES.  John F. Crockett  INVENTOR.
B. W. Williams
J. W. Kidd Jr.

By his Att'ys,
Henry W. Williams & Bro.

UNITED STATES PATENT OFFICE.

JOHN F. CROCKETT, OF LACONIA, NEW HAMPSHIRE.

IMPROVEMENT IN CAR-COUPLINGS.

Specification forming part of Letters Patent No. 218,358, dated August 5, 1879; application filed April 4, 1879.

*To all whom it may concern:*

Be it known that I, JOHN F. CROCKETT, of Laconia, in the county of Belknap and State of New Hampshire, have invented a new and useful Improvement in Draw-Bars for Locomotives and Cars, of which the following is a specification.

This invention consists in a cast-iron draw-bar cast in a single piece, and having openings cored out of each side at or near the head, for the purpose of holding the bail or link, such openings being reached by means of a slot, the upper end of which passes under the platform, so that the bail cannot be removed without removing the draw-bar.

Figure 1:
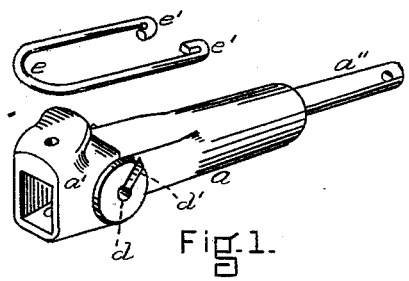
Figure 2:
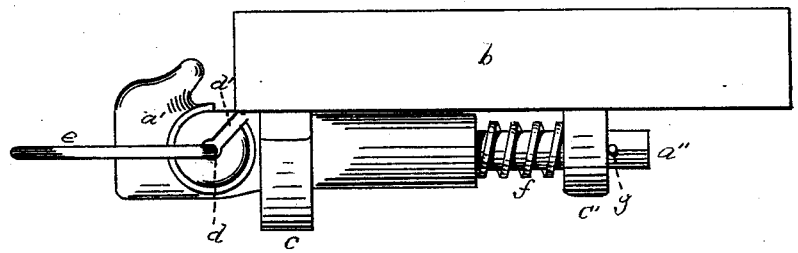
Figure 3:
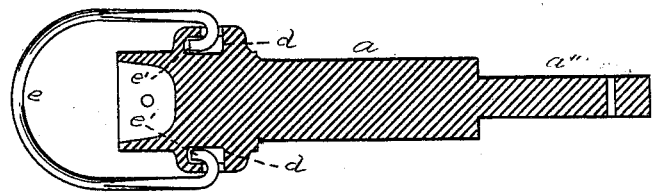

In the accompanying drawings, Figure 1 is a view, in perspective, of my improved draw-bar detached from the platform and with its bail removed. Fig. 2 is a side elevation of the draw-bar and bail in position. Fig. 3 is a horizontal section of the draw-bar with the bail attached.

$a$ is the cast-iron draw-bar, held beneath the platform $b$ by the supports $c$ and $c'$, the latter passing around the tail $a$. $d\ d$ are openings of the shape shown in Fig. 3, cored out of or near the head $a'$ at the sides, and reached by means of the slots $d'$, which extend up and back at an angle of about forty-five degrees, so that their entrances are beneath the platform and close to it. The bail $e$, having turned back ends $e'$, catches in these openings $d$, and is used in place of a link in coupling.

To remove the bail, take out the pin $g$ from the tail, and the spring $f$ will push the draw-bar forward, so that the entrances to the slots $d'$ will be beyond the platform.

Much trouble is caused by the stealing of links. This is entirely obviated by this improvement, as when the draw-bar is in position, as shown in Fig. 2, the bail cannot possibly be removed, save by detaching the draw-bar itself. The draw-bar being cast in one piece, and having the openings $d$ cored out thereof, great strength is obtained, there being no parts to become wrenched off.

Having thus fully described my invention, what I claim, and desire to secure by Letters Patent, is—

1. The hereinbefore-described cast-iron draw-bar for locomotives and cars, cast in a single piece, and provided with openings $d\ d$, cored out of the sides near the head thereof, adapted to receive the ends of a bail acting as a link, as an improved article of manufacture.

2. The hereinbefore-described draw-bar for locomotives and cars when provided with the openings $d$ and slots $d'$, said slots extending from the openings up and back, so as to end beneath the platform, substantially as and for the purpose set forth.

JOHN F. CROCKETT.

Witnesses:
HENRY W. WILLIAMS,
B. W. WILLIAMS.